Dec. 14, 1943. W. M. ALBRECHT 2,336,913
SPROCKET CHAIN LUBRICATION
Filed Feb. 11, 1943
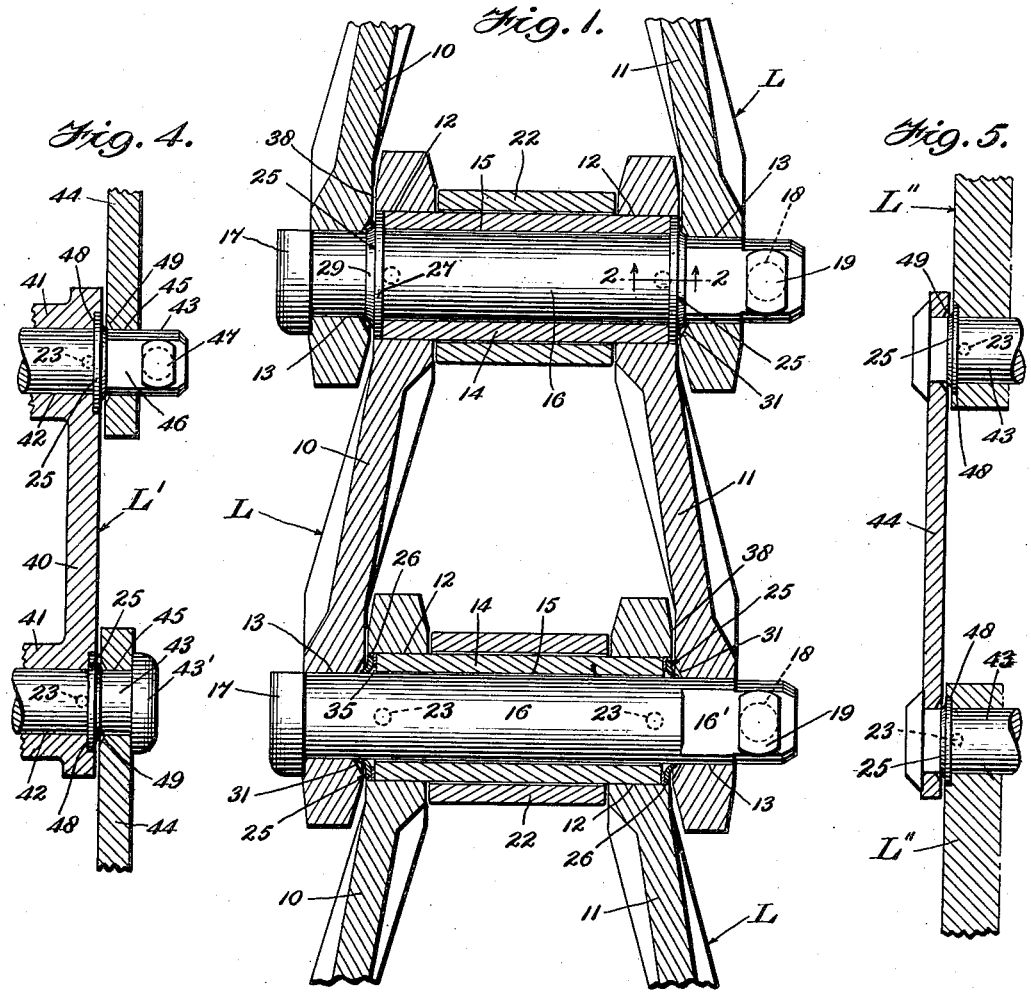
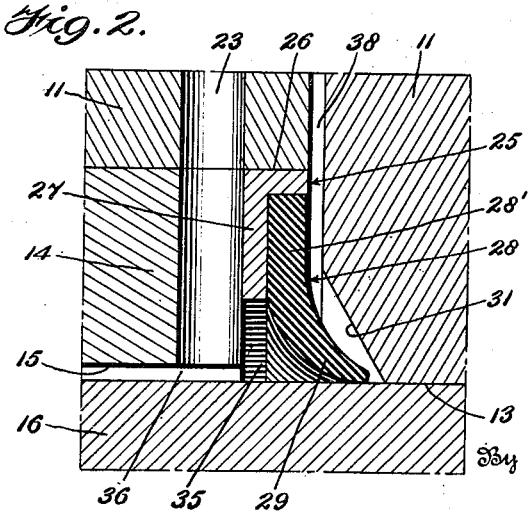
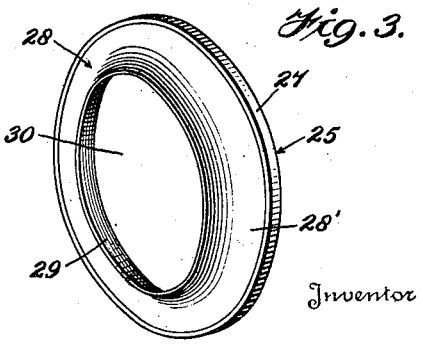
Inventor
WALTER M. ALBRECHT, Patented Dec. 14, 1943

2,336,913

UNITED STATES PATENT OFFICE 2,336,913

SPROCKET CHAIN LUBRICATION

Walter M. Albrecht, Milwaukee, Wis., assignor to Chain Belt Company, Milwaukee, Wis., a corporation of Wisconsin Application February 11, 1943, Serial No. 475,531

7 Claims. (Cl. 74—257)

This invention relates to the lubrication of sprocket chains such as are widely used for power transmission, conveyors, and other purposes, and has for one of its objects to provide a simple, relatively inexpensive and effective arrangement for improving the lubrication of the articulating joints between adjacent links of such chains, by sealing the journals of such joints against the escape of lubricant therefrom, as well as against the entrance of extraneous deleterious matter thereto, whereby wear on and/or damage to the bearing surfaces may be reduced and the life of the chain materially lengthened.

As will appear more fully below, the invention is readily applicable, with substantially a minimum of change in the standardized conventional parts, to practically all types of sprocket chains having articulating joints comprising chain pins carried by one link and journaled in a bearing provided in the adjacent link. It is well known that due to the relatively high bearing pressures developed in these joints, it is desirable that they be constantly lubricated; also, particularly in the case of chains operating in the presence of deleterious materials, as in the conveying of pulverulent or granular abrasive or erosive substances, the journals preferably should be sealed against the entrance of such substances to protect the bearing surfaces against the harmful action thereof.

While the problem has been heretofore appreciated, and attempts have been made to solve it, so far as I am aware none of them has proved commercially successful. For the most part, the prior proposals have involved the material alteration of the standard chain parts, which of itself tended to add prohibitively to the cost of manufacture through the necessity for new tooling, patterns and/or modes of procedure, and in some instances actually seriously reduced the load capacity of the chain below its established rating. In still other cases the prior proposals called for the use of more or less complicated and relatively expensive additional elements, many of which in practice failed to effectively perform their intended functions.

With the shortcomings of these previous attempts to solve the problem in mind, the present invention has been developed for application to all types of articulating-joint chain at a minimum of cost, without substantial alteration of the standard chain parts, and without appreciably affecting the rated load-carrying capacity of the chain; and actual trials have show it to effectively perform its intended purpose of preventing escape of lubricant from the pin journals while excluding extraneous deleterious matter therefrom, through thousands of flexings of the chain, thus indicating long efficient life.

While as above indicated, the invention may find utility in chains of many different types, for purposes of the present disclosure its application has been illustrated in the accompanying drawing forming a part of this specification to three well known and more or less standardized forms of sprocket chains.

In the said drawing:

Figure 1 is a longitudinal sectional view of a small portion of an offset side-bar, fabricated link sprocket chain of a type used in both power transmission and conveyer work, with the present invention embodied therein;

Figure 2 is an enlarged fragmentary sectional view, taken approximately on the plane indicated by the line 2—2 of Fig. 1, looking in the direction of the arrows;

Figure 3 is a perspective view of one of the sealing elements;

Figure 4 is a fragmentary longitudinal sectional view, showing the application of the invention to an open link, straight side-bar form of chain widely used for conveying purposes; and Figure 5 is a view similar to Fig. 4 illustrating use of the invention in a block chain.

Referring more particularly to Figures 1 and 2 of the drawing, the offset side-bar chain shown therein comprises fabricated links L, each of which includes a pair of transversely spaced side-bars 10 and 11, the opposite ends of which are laterally offset to produce a link having a wide end and a narrow end, the latter being receivable within the wide end of the next adjacent link, as will be clear from Fig. 1. The side-bars are apertured at each end, as indicated at 12 and 13, the apertures 12 at the narrower end of the link being of somewhat greater diameter than the apertures 13 at the wider end, and receiving the opposite end portions of a tubular sleeve or bushing 14, which is press-fitted into said apertures thus providing a rigid U-shaped structure. With the apertures 13 of one link alined with bore 15 of the bushing 14 of the adjacent link, a chain pin 16 is slipped through them to articulately connect the links. The said pin has a preformed head 17 at one end and a transverse aperture 18 at the other end to receive a retaining cotter 19. The chain pins 16 may be held against rotation in the apertures 13 in any appropriate manner, as by flats 16' formed on them adjacent their unheaded ends, engageable with companion flats formed on the peripheries of the apertures 13. A roller 22 may be journalled upon each bushing or sleeve 14 between the side bars 10 and 11, to engage the sprocket teeth and take the wear of such engagement.

The diameter of the bore 15 of the bushing 14 is such relative to that of the chain pin 16 as to provide a working fit between the two so that the links may articulate, and for best working conditions the bearing surfaces of these parts should of course be lubricated. To this end a suitable lubricant may be introduced to the bearing surfaces through apertures 23 in the side bars and the bushing wall.

As above indicated, it is desirable to prevent the escape of such lubricant at the ends of the bushings 14, so as to reduce the frequency of supplying the lubricant; likewise, it is desirable to prevent entrance of extraneous matter into the bearings; and to these ends sealing members 25, constituting the gist of the present invention, are provided at these points.

In previous chain constructions of this type, the bushings 14 have extended completely through the side-bars 10 and 11 so that the bushing ends were flush with the outer side faces of the said side-bars. In the present instance, however, the bushings are shortened somewhat and terminate, say, 1/16" short of the side-bar faces, thus providing a circular recess or counterbore 26 at each side-bar outer face, in each of which recesses a sealing member 25 is positioned.

As best shown in Figs. 2 and 3, these sealing members each comprise a metallic annulus 27, of L-shaped cross section, and a resilient annulus 28, of natural rubber, "synthetic" rubber, or equivalent material, secured to said metal annulus. The resilient annulus comprises an outer circumferential body portion 28', which fits in and is suitably bonded to the L-shaped metal annulus 27, and an inner circumferential portion 29, constituting a tapering flexible lip, which extends radially inward beyond the annulus 27 and engages the outer circumference of the chain pin 16, all as will be readily understood from Fig. 2. The diameter of the aperture 30 of the annulus 28 is preferably slightly less than the diameter of the chain pin 16 to insure intimate sealing engagement between the two elements.

When viewed edgewise, the flexible lip portion 29 of the annulus 28 may be normally straight and substantially alined with the outer circumferential body portion 28' thereof; but preferably the annulus 28 is pre-formed with the said lip portion curved somewhat, as indicated in Figs. 2 and 3. In either case, the engagement of the lip with the circumferential surface of the pin 16 will approximate a line contact conducive to a minimum of frictional resistance to articulating movements of the joint compatible with an efficient sealing engagement between the lip and the pin surface. Further, in either case the zone of contact between the lip and the pin surface is spaced in an axial direction from the end face of the bushing 14, thus, in conjunction with the supporting metallic annulus 27, providing an annular chamber or pocket 35 adapted to receive and retain lubricant, and supply it to the working clearance 36 between the pin and bushing bearing surfaces. The lubricant supply ducts 23, while communicating at their inner ends with said clearance, preferably are so positioned as to also discharge to the chamber 35, as indicated in Fig. 2.

The flexibility of the lip 29 and its engagement with the pin in axially spaced relation to the end of the bushing 14, enables the sealing element to accommodate the usual tolerances permitted in the dimensions of the parts, and facilitates assembly.

While working clearances 38 are provided between the complementary overlapping faces of the link side-bars at the joints, the lips 29 of the resilient sealing members 28 may, and usually do, flare outwardly a distance greater than the said clearances; and in order to accommodate the lips the inner faces of the side-bars surrounding the apertures 13 are countersunk, as indicated at 31. This, together with the fact that the seal members 25 are seated in the counterbores or recesses 26 with the outer end faces of the seals substantially flush with the outer faces of the inner side-bars, prevents damaging contact between the inner faces of the outer side-bars and resilient sealing elements 28 when the links shift axially of the pins 16 during operation and lessen or completely close the clearance spaces 38. Even should the sealing members 25 not be completely flush with the side-bar faces, such axial shifting of the links would bring the inner face of the outer side-bar into engagement with the end face of the short leg of the L-shaped metallic supporting annulus 27 and thus protect the resilient annulus 28 against damage.

In Fig. 4 there is illustrated the application of the invention to an open link straight side-bar conveyor chain, wherein the links L' are of hollow rectangular form having straight side-bars 40 connected at their ends by integral transverse barrels 41 provided with bores 42 for receiving and journaling the chain pins 43. A series of such such links is connected together in spaced relation by independent straight side bars 44 having apertures 45 for receiving the ends of the chain pins 43, which are held against rotation therein as by flats 46 and restrained against dislodgment by heads 43' and cotters 47. The outer side faces of the links L' are counterbored as at 48 to receive the sealing elements 25, and the complementary faces of the side-bars 44 are countersunk as at 49 to accommodate the lips 29 of said elements.

The chain shown in Fig. 5 is somewhat similar to that illustrated in Fig. 4, except that solid or block links L'' are employed instead of open rectangular links L', and the ends of the pins 43 are headed or riveted in the straight independent side-bars 44.

As above indicated, the depth of the recesses or counterbores 26, 48 and of the countersinks 31, 49 need be say only 1/16 of an inch for a chain of four inch pitch, which is relatively small as compared to the other dimensions of such a chain, and obviously their provision does not appreciably affect the load carrying capacity of the chain. Furthermore, no special tools not already possessed by any shop are required to condition the links for reception of the sealing elements, and the latter, because of their extremely simple construction, may be easily manufactured in quantities at extremely low cost.

Having thus described the invention, what is claimed is:

1. In a sealing arrangement for an articulating joint of a sprocket chain having a link element and a chain pin carried thereby: a second link element having a portion disposed in overlapping relationship to the pin-carrying portion of said first element with working clearance between the two which accommodates movements of one relative to the other both circumferentially and axially of the pin, said second link element having a bore for journaling a portion of said pin, and a counterbore providing a recess surrounding the pin at the end of said bore; and a sealing element seated in said recess, comprising an annulus having a substantially rigid outer circumferential portion and a flexible inner circumferential portion including a lip yieldably engaging the surface of the chain pin to prevent passage of material axially to and from the journal bearing, the outer end face of at least the outer circumferential portion of said sealing element being substantially flush with the end face of its carrying link element, whereby the flexible portion of the sealing annulus may not be damaged through reduction or elimination of the clearance between the overlapping portions of the two link elements due to shifting of one relative to the other axially of the pin.

2. A sealing arrangement according to claim 1, wherein the flexible lip portion of the sealing annulus is tapering and engages the pin surface in a zone axially spaced from the bottom of the recess to provide an annular lubricant-retaining pocket.

3. A sealing arrangement according to claim 1, wherein the flexible lip portion of the sealing annulus is flared axially outwardly and engages the pin surface in a zone axially spaced from the bottom of the recess to provide an annular lubricant-retaining pocket; and the carrying link element is provided with a duct for supplying lubricant to said pocket.

4. A sealing arrangement according to claim 1, wherein the flexible lip portion of the sealing annulus is tapering and flared axially outwardly to engage the pin surface with a substantially line contact in a zone axially spaced from the bottom of the recess.

5. A sealing arrangement according to claim 1, wherein the flexible lip portion of the sealing annulus is flared axially outwardly and engages the pin surface in a plane beyond the end face of its carrying link portion, and the overlapping portion of the companion link element is recessed to prevent contact and damage to said lip portion.

6. A sealing arrangement according to claim 1, wherein the sealing annulus of the sealing element is of resilient material, and its outer circumferential portion is carried and rigidly supported by a metallic annulus.

7. In an articulating joint for sprocket chains, a link element comprising companion spaced side bars having alined pin-receiving apertures in a portion thereof, the inner faces of said bars being countersunk around said apertures; a chain pin mounted in said apertures; a second link element comprising companion spaced side bars having alined bushing-receiving apertures in a portion thereof adapted to overlap the pin-carrying portion of said first element with working clearance between them; a tubular bushing rigidly mounted in said last named apertures for journaling a portion of said chain pin, said bushing terminating short of the outer faces of its side bars to provide an axially-shallow annular recess at each end of the pin bearing; and an annular sealing element seated in each of said recesses, the outward faces of the outer circumferential portions of which elements are substantially flush with the outward faces of their carrying side bars, and the inner circumferential portions of which sealing elements comprise flexible lips engaging the surface of the chain pin to prevent passage of material to and from the pin bearing, said lips flaring axially outward across said working clearances and being accommodated by the countersinks in the first named side bars, whereby the lips are protected against contact with and damage by such side bars.

WALTER M. ALBRECHT.